Patented May 30, 1950

2,509,574

UNITED STATES PATENT OFFICE 2,509,574

BITUMINOUS EMULSIONS

Paul E. McCoy, San Francisco, Calif., assignor, by mesne assignments, to Stancal Asphalt & Bitumuls Company, San Francisco, Calif., a corporation of Delaware No Drawing. Application July 31, 1946,
Serial No. 687,531

10 Claims. (Cl. 106—277)

This invention relates to quick-breaking bituminous emulsions; more particularly, to quick-breaking asphalt emulsions.

Quick-breaking bituminous emulsions, as the term is used in the art and herein, are oil-in-water type emulsions of asphalt (residue from distillation of petroleum, and natural asphalt), coal tar, coal tar pitch and other liquid of heat-liquefiable carbonaceous materials, which undergo rapid breakdown on contact with aggregates (rock, sand, gravel, soil, etc.).

More narrowly defined, they are oil-in-water type emulsions of bituminous materials having high enough residue (55 to 70%) to be useful as road binders and the like, and undergoing not less than 60% breakdown on admixture with 35 mls. of 0.02 N calcium chloride in accordance with the procedure of A. S. T. M. D244-42 Demulsibility Test.

It is desirable that bituminous road binders and the like have what is known as good "adhesion" to aggregates, more particularly to hydrophilic aggregates exemplified by Massachusetts rhyolite and Louisiana slick gravel. Bitumens, and particularly asphalt, exhibit a tendency to strip from aggregates after having been mixed therewith.

Various means of inhibiting this stripping tendency have been proposed, among which the most satisfactory are those means whereby a small amount of an "adhesion" agent is added to the bituminous binder.

Many such adhesion agents are incompatible with oil-in-water type bituminous emulsions, being either insoluble in the aqueous phase or having a strong tendency to break the emulsion.

In my copending application Serial No. 350,053, filed August 2, 1940, now Patent 2,412,526, of which this application is a continuation-in-part, the use of alkali metal dichromates as adhesion agents for bituminous emulsions is described. These dichromates, while highly effective as agents for this purpose, have a tendency to break, or to cause shot formation in quick-breaking emulsions.

It is an object of the present invention to provide a means of incorporating alkali metal dichromates in quick-breaking emulsions of the oil-in-water type, while avoiding or reducing the tendency of the dichromate to break the emulsion or otherwise impair its qualities.

It is a further object of the invention to provide quick-breaking, oil-in-water type asphalt emulsions containing sufficient alkali metal dichromate substantially to improve the adhesion of the asphalt to aggregates, which emulsions are nevertheless stable on normal storage and handling prior to admixture with aggregate.

These and other objects of the invention will be apparent from the ensuing description and the appended claims.

In accordance with the procedure and in producing the product of the invention, a bituminous material is dispersed in alkaline water to produce a quick-breaking emulsion, and there is incorporated in the alkaline water, at a time before the water and bituminous material cease to be subjected to emulsifying conditions, a small amount, sufficient to promote adhesion but insufficient to cause breakdown of the finished product, of an alkali metal dichromate.

By this means, a much better product is obtained showing much less tendency to break down than is obtained by adding the dichromate to the emulsion after it has been formed.

The materials going into the product thus manufactured are bituminous material, alkaline water, dichromate and an emulsifier or a material capable of reacting with the alkali to produce an emulsifier. As explained in more detail below, the emulsifier may be (and preferably is), the reaction product of the alkali contained in the water and saponifiable material contained in the bitumen, in which case emulsifier need not be added as a separate ingredient.

The bituminous material may be any liquid or heat-liquefiable carbonaceous material, such as natural asphalt, asphaltic residua from the distillation of petroleum, coal tar, coal tar pitch, road oils from petroleum, etc., but preferably it is an asphalt, which may, as stated, be a natural or an artificially produced product, and which may have a penetration (A. S. T. M. D-5 method) of 300 or higher to zero. Both steam refined and air blown asphalts may be used.

Most advantageously, an asphalt is used which contains saponifiable material of such kind and in such amount as to be emulsifiable in hot, dilute caustic alkali by the method of Montgomerie, United States Patent No. 1,642,675 or the method of Braun, United States Patent No. 1,737,491. Alternatively, and still within the preferred embodiment of the invention, an asphalt which is normally not so emulsifiable, but which has been modified in accordance with the procedure of Fratis and Oakley, patent application Serial No. 404,196, filed July 26, 1941, now Patent 2,406,823, may be used.

The alkaline water used in emulsification may be water rendered alkaline with any of a group of water-soluble alkalis forming water-soluble salts, such as sodium and potassium hydroxide, trisodium phosphate, ammonia, water-soluble amines, water-soluble quaternary ammonium bases such as tetraethanol ammonium hydroxide, etc. Preferably, however, the alkali is sodium or potassium hydroxide. The alkalinity of the water before admixture with the dichromate is preferably within the approximate limits of pH 10.5 to 13. When potassium hydroxide is used as the alkali, the alkaline water, before emulsification and before addition of dichromate, preferably contains about 0.2 to 0.5% KOH; that is, about 0.1 to 0.25% KOH based on finished emulsion containing 55% asphalt. Suitable proportions of other alkalis, and suitable proportions of alkali based upon finished emulsions containing other proportions of asphalt, can be readily calculated.

The dichromate is preferably sodium dichromate, generally available as $Na_2Cr_2O_7 \cdot 2H_2O$, but potassium dichromate serves equally well and lithium and ammonium dichromates may also be used.

The emulsifier, as stated, may be, and preferably is, the reaction product of saponifiable material present in the asphalt, either as naturally occurring ingredients or by reason of modification of the asphalt, as explained. However, an added soap-type or even non-soap type emulsifier may be employed. Thus, to the alkaline water may be added a small amount of rosin oil, oleic acid, alcohol-soluble, gasoline-insoluble pinewood resins described and claimed in United States Patent 2,193,026 to Lucius Coleman Hall, or a sodium or potassium salt of the same, or a mixture of such saponifiable or saponified materials. Or a protein such as water-soluble blood (either water-soluble dry blood, such as described in McKesson, United States Patent No. 2,074,731 or liquid, homogenized coagulated blood such as described in Buckley and Bly, United States Patent No. 2,372,658), may be used as the emulsifier. Other suitable emulsifiers will be apparent to one skilled in the art.

These emulsifiers should be used in such amount as to produce a quick-breaking emulsion; stable on storage and handling, but breaking quickly on contact with aggregate. The exact proportion used in any given case will depend on factors such as the residue of the emulsion and the nature of the asphalt. Thus, emulsions of high residue require more emulsifier than emulsions of low residue, while asphalts which are substantially devoid of saponifiable constituents will require more added emulsifier than asphalts which contain a substantial amount of saponifiable constituents. As an example, an asphalt from Mid-Continent crude containing very little saponifiable matter and incapable of emulsification by the Montgomerie or Braun process, will require 0.05 to 0.5% of Swedish rosin oil to produce a satisfactory, 55% residue asphalt emulsion. Choice of proper proportion of emulsifier can be made readily by one skilled in the art in any given case.

Various procedures may be used to produce the emulsions of the invention. Thus, molten asphalt at about 230 to 280° F. may be added to a hot (130 to 180° F.) aqueous alkaline solution (containing added emulsifier, if any) in an open mix pot provided with a propeller-type agitator. Emulsification will take place immediately. Or the procedure of Braun, United States Patent No. 1,737,491 may be employed; that is, to a seed batch of previously formed emulsion are added simultaneously the molten asphalt and hot aqueous alkali, and a portion of the emulsion thus produced is used as a seed batch for making a further quantity of emulsion. Or the molten asphalt and hot aqueous alkali may be fed simultaneously to a colloid mill, in which the ingredients are subjected to the powerful shearing forces of two surfaces moving relatively to one another. A suitable mill for this purpose is the well known Charlotte mill. Preferably, however, an open mix pot is used.

In any case, the dichromate ingredient is incorporated in the mixture at a time before the water and bituminous material cease to be subjected to emulsifying conditions. Thus, the dichromate may be added to the alkaline water before the latter is mixed with the bitumen. Or three separate streams of ingredients may be fed to emulsifying apparatus containing a seed batch of emulsion; that is, a stream of bitumen, a stream of alkaline water and a stream of aqueous dichromate solution (which latter is conveniently of 10% strength), may be supplied simultaneously to a seed batch of previously formed emulsion. Or the dichromate in solution form may be injected into the emulsifying apparatus at a point where emulsification has already occurred or is proceeding, but where emulsifying conditions still prevail.

The important consideration, in any case, is that the dichromate be not added to the emulsion after it has been formed and is no longer subjected to the emulsifying action. By observing this precaution, breakdown of the emulsion or other harmful effects are avoided or greatly reduced. Preferably, the dichromate is added to the alkaline water before admixture of the latter with the bitumen, or it is added as a third stream along with bitumen and alkaline water to a seed batch of emulsion.

The amount of dichromate incorporated in the emulsion should be sufficient substantially to promote adhesion of the bitumen to aggregates but insufficient to cause breakdown of the emulsion. Preferably, about 0.05 to 0.5% of dichromate, based on weight of finished emulsion, is incorporated. Dichromates are rather strongly acidic; and if too much is added, the alkalinity of the emulsion may be reduced to a point where the emulsion is unstable.

As added precautions to prevent possible harmful effects of the dichromate on the stability and marketability of the emulsion, further to promote adhesion, and to prevent or delay phase separation (i. e., a settling of water to the bottom and a rise of bitumen to the top of the emulsion container or the reverse), the following directions may be followed: A stabilizer such as Swedish rosin oil or alcohol-soluble, gasoline-insoluble pinewood resins described and claimed in United States Patent 2,193,026 to Lucius Coleman Hall (as such or saponified) or a protein material such as blood, may be added to the emulsion after it has been made. This renders the emulsion more stable, but care should be taken not to use sufficient stabilizer to prevent rapid breakdown on contact with aggregate. Usually 0.05 to 0.15% of added stabilizer is sufficient. The added stabilizer, as in the case of Swedish rosin oil and alcohol-soluble, gasoline-insoluble pinewood resins described and claimed in United States Patent 2,193,026 to Lucius Coleman Hall, may also improve adhesion. Also, a small amount, usually about 0.15 to 0.50% based on weight of finished emulsion, of bentonite clay may be added to the emulsion, or to the alkaline water prior to emulsification, to resist phase separation.

The following specific examples will serve further to illustrate the practice and advantages of the invention.

*Example I.*—Three emulsions were prepared approximately as follows: Emulsion A was an emulsion of a 200 penetration Venezuelan asphalt. The asphalt was heated to 250° F. An aqueous KOH solution was prepared and to it was added a 10% aqueous solution of sodium dicromate. Alkalinity of the KOH solution was determined by titration before and after addition of dichromate. This aqueous KOH solution, to which had been added sodium dichromate, was heated to 140° F. and placed in an open mix pot provided with a propeller-type agitator. The propeler was set in motion and was operated at high speed while the hot asphalt was poured in in quantity sufficient to produce the desired residue. Emulsions B and C were similarly prepared, but to different residues, and Emulsion C was made from an asphalt of about 350+ penetration.

Tests were made of these emulsions, with results as given in the table, below.

Table

| Emulsion | Per Cent KOH in water before adding Dichromate[1] | Per Cent Dichromate Added, Based on Finished Emulsion | Per Cent KOH in water after adding Dichromate[1] | Residue of Emulsion | Adhesion |
|---|---|---|---|---|---|
| | | | | | Per cent |
| A | 0.13 | 0.20 | 0.06 | 57 | 85–100 |
| B | 0.13 | 0.20 | 0.06 | 62 | 80–95 |
| C | 0.13 | 0.175 | 0.07 | 66 | 80–95 |

[1] Based on finished emulsion.

KOH was determined by titration with 0.1 N HCl, using phenolphthalein as indicator. Residue was determined by the procedure of A. S. T. M. D244–42. Adhesion was determined as follows: 200 grams of dry standard Massachusetts rhyolite, graded so as to pass entirely through a ¼-inch (No. 3) sieve and to be retained completely on a No. 10 sieve, were taken. This aggregate was heated to 300° F. and mixed with 16 grams of emulsion until complete coating resulted. Three 50 gram samples of the coated aggregate were then taken and each was spread thinly on a metal can lid and left in an oven for 48 hours at 140° F. Each cured sample was then dropped into 400 cc. of boiling distilled water in a 600 cc. beaker and stirred 3 minutes at the rate of 60 times a minute, boiling meanwhile being continued. Each beaker was then removed from the heat, and, after ebullition had ceased, cold water was run into the beaker through a submerged hose until any film of asphalt on the surface of the water was flushed out. Each sample of aggregate was then removed and placed on absorbent paper and air dried. The dried samples were then inspected visually by an experienced observer to estimate the percentage area coated, uncoated area being deemed that retaining no asphaltic coating. The figures for the three samples were then averaged.

*Example II.*—A 55% residue emulsion of a 200 penetration California asphalt was prepared, using 0.32% aqueous NaOH as the aqueous phase and employing the procedure of Braun, United States Patent No. 1,737,491. In one case no dichromate was added while in another case a 10% aqueous solution of sodium dichromate was fed to the emulsifying apparatus simultaneously with the hot asphalt and hot aqueous alkali, in amount sufficient to incorporate 0.5% $Na_2Cr_2O_7$ in the emulsion. Both emulsions were of good quality, the emulsion containing dichromate being in no manner inferior to the emulsion containing no dichromate. In addition, the emulsion containing dichromate exhibited greatly improved adhesion on Louisiana slick gravel and Greenbrae (Marin County, California) aggregate, both of which are hydrophilic aggregates to which asphalt adheres poorly.

*Example III.*—Quick-breaking emulsions were made of an SC-6 road oil by the method of Braun. In several cases, sodium dichromate was added to the alkaline water before emulsification; in other cases, the dichromate was added to the emulsifying apparatus in the form of a 10% solution, simultaneously with the road oil and alkaline water. A control sample (no dichromate) was similarly prepared. Adhesion tests were made on the emulsion, with results as follows:

| Per Cent $Na_2Cr_2O_7$[1] | How Added | Per Cent Adhesion (Greenbrae Aggregate) |
|---|---|---|
| nil | | 5 |
| 0.1 | To alkaline water | 25 |
| 0.2 | do | 75 |
| 0.3 | do | 75 |
| 0.1 | As separate stream, simultaneously with road oil | 50 |
| 0.2 | do | 75 |
| 0.3 | do | 90 |

[1] Based on finished emulsion.

I claim:

1. A method of preparing a quick-breaking, free-flowing, oil-in-water type bituminous emulsion having an A. S. T. M. D-244 demulsibility of not less than about 60%, stable in storage and handling and stable in storage against the incorporation therein of as much as 0.5% by weight of the emulsion of ammonium and alkali metal dichromates, comprising emulsifying a bituminous material in water to produce a quick-breaking bitumen-in-water emulsion and incorporating in the emulsion, at a time before the water and bituminous material cease to be subjected to emulsifying conditions, a small amount of a salt selected from the group consisting of ammonium dichromate and alkali metal dichromates, said bituminous emulsion comprising by weight about 55–70% bituminous material, 30–50% of water and 0.05–0.5% of said salt.

2. The method of claim 1, wherein the bituminous material is asphalt.

3. The method of claim 1, wherein the water is rendered alkaline by caustic alkali and has a pH of about 10.5–13 before incorporation of the dichromate.

4. The method of claim 1, wherein the emulsification is carried out by separately but simultaneously supplying heated bitumen, an aqueous solution of said dichromate salt and an aqueous solution of caustic alkali to a body of preformed bitumen-in-water emulsion.

5. A method of preparing a quick-breaking, free-flowing, oil-in-water type asphalt emulsion having an A. S. T. M. D-244 demulsibility of not less than about 60%, stable in storage and handling and stable in storage against the incorporation therein of as much as 0.5% by weight of the emulsion of ammonium and alkali metal dichromates, comprising emulsifying an asphalt in dilute, aqueous caustic alkali, said asphalt being of the type which emulsifies in dilute, aqueous caustic alkali, and incorporating in the emulsion 0.05–0.5% by weight of the emulsion of a salt selected from the group consisting of ammonium dichromate and alkali metal dichromates, said salt being incorporated in the emulsion by adding it at a time not later than the time of juncture of the asphalt and aqueous caustic alkali, said emulsion comprising by weight about 55–70% of asphalt and 30–50% of water.

6. The method of claim 5, wherein emulsification is carried out by separately but simultaneously supplying heated asphalt, an aqueous solution of the said dichromate salt and a heated aqueous solution of caustic alkali to a body of preformed asphalt-in-water emulsion.

7. The method of claim 5, wherein the emulsifying agent consists essentially of the reaction products of the asphaltic acids naturally present in the asphalt and the aqueous caustic alkali.

8. A quick-breaking, liquid, free-flowing, oil-in-water type bituminous emulsion having an A. S. T. M. D-244 demulsibility of not less than about 60%, stable in storage and handling and stable in storage against the incorporation therein of as much as 0.5%, by weight of the emulsion, of ammonium and alkali metal dichromates, said emulsion comprising by weight about 55–70% of bituminous material, 30–50% of water, and 0.05–0.5% of a salt selected from the group consisting of alkali metal dichromates and ammonium dichromate, said salt having been incorporated in the emulsion at a time before the water and the bituminous material cease to be subject to emulsifying conditions.

9. A quick-breaking, liquid, free-flowing, oil-in-water type bituminous emulsion having an A. S. T. M. D-244 demulsibility of not less than about 60%, stable in storage against the incorporation therein of as much as 0.5%, by weight of the emulsion, of ammonium and alkali metal dichromates, said emulsion comprising by weight about 55–70% of a bitumen, 30–50% of water, and 0.05–0.5% of a salt selected from the group consisting of alkali metal dichromates and ammonium dichromate, said salt having been incorporated in the emulsion by separately but simultaneously supplying heated bitumen, an aqueous solution of said dichromate salt and an aqueous solution of caustic alkali to a body preformed bitumen-in-water emulsion.

10. A quick-breaking, liquid, free-flowing, oil-in-water type asphalt emulsion having an A. S. T. M. D-244 demulsibility of not less than about 60%, stable in storage and handling and stable in storage against the incorporation therein of as much as 0.5%, by weight of the emulsion, of ammonium and alkali metal dichromates, said emulsion comprising by weight about 55–70% of asphalt, 30–50% of water, and 0.05–0.5% of a salt selected from the group consisting of alkali metal dichromates and ammonium dichromate, said asphalt being of the type which emulsifies in dilute aqueous caustic alkali, the aqueous continuous phase of the emulsion containing about 0.1–0.5% by weight of the emulsion, of caustic alkali, and said dichromate salt being incorporated in the emulsion by adding it at a time not later than the time of juncture of the asphalt and aqueous caustic alkali.

PAUL E. McCOY.

REFERENCES CITED

The following references are of record in the file of this patent:

UNITED STATES PATENTS

| Number | Name | Date |
|---|---|---|
| 2,055,612 | Robinson | Sept. 29, 1936 |
| 2,330,100 | Williams | Sept. 21, 1943 |
| 2,412,526 | McCoy | Dec. 10, 1946 |

FOREIGN PATENTS

| Number | Country | Date |
|---|---|---|
| 341,443 | Great Britain | Jan. 9, 1931 |
| 465,589 | Great Britain | May 10, 1937 |